March 3, 1931. E. C. HERTHEL 1,795,124
ART OF REFINING HYDROCARBONS
Filed Sept. 14, 1928
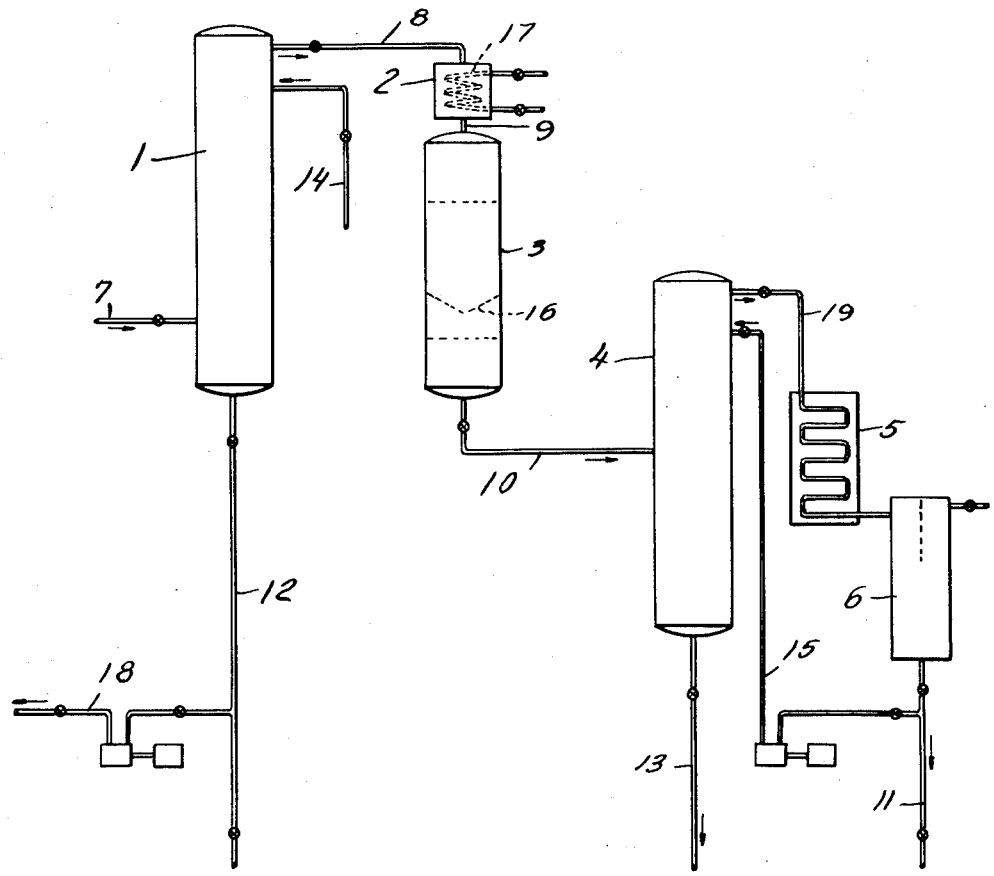
INVENTOR
Eugene C. Herthel
BY
ATTORNEYS Patented Mar. 3, 1931

1,795,124

UNITED STATES PATENT OFFICE

EUGENE C. HERTHEL, OF CHICAGO, ILLINOIS, ASSIGNOR TO SINCLAIR REFINING COMPANY, OF NEW YORK, N. Y., A CORPORATION OF MAINE

ART OF REFINING HYDROCARBONS

Application filed September 14, 1928. Serial No. 305,904.

This invention relates to improvements in refining gasoline by passage of the gasoline vapors through an adsorptive catalyst, such as fuller's earth, causing polymerization of unsaturated constituents unsuitable as components of the refined gasoline product. The invention is of special value and application in connection with the refining of cracked gasoline, particularly gasoline produced by severe vapor phase cracking, but it is also of more general application.

When gasoline, particularly gasoline produced by severe vapor phase cracking, is passed in vapor phase through such adsorptive catalysts, certain unsaturated constituents such as the di-olefines, to the extent that they are present, are polymerized to form higher boiling polymers. This reaction affords a means of separating such constituents without involving loss of other unsaturated constituents of special value as components of motor fuel gasoline. The separation of the polymers produced by the vapor-catalyst contact is usually accomplished by fractional condensation, liquefaction, either in the refining operation proper or in some subsequent fractionating operation.

As generally practiced, this general method has involved charging of a suitable receptacle with a batch of the adsorptive catalyst passing the vapors to be refined through this receptacle in contact with the adsorptive catalyst until the catalyst has lost its effectiveness, discharging the spent adsorptive catalyst, replacing the discharged adsorptive catalyst with a fresh charge of the adsorptive catalyst, and so on. The period of operation is thus limited to that period over which the adsorptive catalyst remains sufficiently active to effect the required refining treatment. The adsorptive catalysts commonly used, fuller's earth for example, moreover assume an apparent state of inactivity before the catalyst itself actually becomes ineffective by choking with high boiling polymers produced by the vapor-catalyst contact. This difficulty is particularly acute where the vapors to be refined contain a large proportion of material polymerizing on contact with the adsorptive catalyst, vapor mixtures produced by severe vapor phase cracking for example. The period of operation is thus further limited.

This invention provides an improved method of refining gasoline, particularly cracked gasoline, by which the period of effective activity of the adsorptive catalyst is prolonged, by which the useful period of operation is prolonged and by which several further advantages are obtained.

According to the present invention, the gasoline to be refined is supplied to the refining operation as a vapor mixture including, in addition to the gasoline vapors, vapors of higher boiling hydrocarbons in proportions such that the vapor mixture when condensed forms a condensate containing not less than about 50% and not more than about 75%, or better not less than about 60% and not more than about 70%, of the gasoline product; this vapor mixture, before being passed through the adsorptive catalyst in the refining operation proper, is passed through a condensing operation in which a part of the higher boiling hydrocarbons present in the vapor mixture is condensed; the total resulting vapor mixture including the condensate so produced is then passed through the adsorptive catalyst in the refining operation proper; the higher boiling constituents unsuitable as components of the gasoline product are condensed and separated from the vapor mixture after passage through the adsorptive catalyst; and the remaining vapors are condensed to form the refined gasoline product. The polymers produced by the vapor-catalyst contact and the condensate produced in the preceding condensing operation may be separated, or in part separated, in the refining operation proper but, in carrying out the present invention, it is particularly advantageous to subject the total vapor mixture including such polymers and condensate produced by the vapor-catalyst contact to a fractionating operation and to separate and condense in this fractionating operation the constituents higher boiling than suitable as components of the gasoline product including the polymers produced by the vapor-catalyst contact and the condensate produced in the preceding condensing operation.

The condensate produced in the condensing operation preceding the refining operation proper, in carrying out the invention, is a particularly effective washing agent and it is supplied to the refining operation proper, in carrying out the invention, in a particularly effective way, distributed throughout the vapor mixture including the vapors to be refined. By maintaining continued flow of the total vapor mixture through the refining operation proper, retention of polymers or of the condensate produced in the preceding condensing operation in or on the adsorptive catalyst, with consequent decrease in catalyst activity, is reduced to a minimum. Difficulties due to entrainment of the polymers produced by the vapor-catalyst contact or of the condensate produced in the preceding condensing operation in the vapor mixture condensed to form the refined gasoline product are also thus avoided.

The invention will be further described in connection with the accompanying drawing which illustrates, diagrammatically and conventionally, one form of apparatus adapted for carrying out the invention, but it will be understood that the invention can be carried out in other and different forms of apparatus.

The apparatus illustrated comprises a fractionating tower 1, a condenser 2, a refining tower 3, another fractionating tower 4, another condenser 5 and a receiver 6. Raw vapors are supplied to the lower end of tower 1 through connection 7, the vapor mixture escaping from the upper end of tower 1 is conveyed to the top of condenser 2 through connection 8 and from the bottom of condenser 2 to the upper end of tower 3 through connection 9, the vapor mixture escaping from the lower end of tower 3 is discharged into tower 4 at an intermediate point through connection 10, the vapors escaping from the upper end of tower 4 are condensed in condenser 5 and the resulting condensate, after separation from any uncondensed vapors and gases in receiver 6, discharged through connection 11. Condensate is discharged from the lower end of tower 1 through connection 12 and condensed and separated material is discharged from the lower end of tower 4 through connection 13. The tower 1 may be of open baffle type or better of so-called "bubble" type or other type adapted to permit close fractionation; similarly the tower 4 is best of "bubble" type or other type adapted to permit close fractionation. Condensation in tower 1 may be controlled by direct introduction of a refluxing agent, such as an oil fraction, through connection 14, or by circulation of a cooling medium through cooling coils (not illustrated) in the upper end of the tower. Condensation in tower 4 may also be controlled by direct introduction of a refluxing agent, such as a part of the condensed gasoline product, through connection 15, or by circulation of a cooling medium through cooling coils (not illustrated) in the upper end of the tower. In the refining tower 3, the vapor mixture is passed downwardly through a charge of an adsorptive catalyst, such as 40—60 or 60—80 fuller's earth, supported upon a foraminous partition 16. The partial condensation carried out in condenser 2 may be effected and controlled by regulated circulation of a cooling medium, water or an oil fraction for example, through the cooling coil 17.

The apparatus illustrated may be connected, for example, directly to a vapor phase cracking apparatus such as that described in an application filed June 13, 1927, by Harry L. Pelzer, Serial No. 198,621. For example, the vapor mixture escaping from the scrubbing tower or from a subsequent reflux tower or fractionating tower in that apparatus may be supplied to tower 1 through connection 7 and the condensate discharged from tower 1 through connection 12 may be supplied through connection 18 to the heater or to the upper end of the scrubbing tower or to the upper end of a subsequent reflux tower or fractionating tower in that apparatus.

In carrying out the present invention in the apparatus illustrated, a vapor mixture including the gasoline vapors to be refined and higher boiling hydrocarbon vapors are supplied to the lower end of tower 1 through connection 7. In tower 1 this vapor mixture is subjected to fractionation controlled so that the vapor mixture escaping through connection 8 when condensed forms a condensate containing not less than 50-60% and not more than 70-75% of the gasoline product. In condenser 2 this fractionated vapor mixture is partially condensed, and the resulting vapor mixture including such condensate, without separation of the condensate so produced, is passed through the refining tower 3 and therein subjected to the action of the adsorptive catalyst at the same time that the adsorptive catalyst is subjected to the washing action of the condensate distributed through the vapor mixture. The partial condensation carried out in condenser 2 is advantageously controlled to avoid condensation of gasoline constituents so that the condensate produced therein consists essentially of hydrocarbon constituents higher boiling than gasoline constituents. In tower 4 the total vapor mixture escaping from the refining operation proper is subjected to fractionation advantageously controlled so that the vapors escaping through connection 19 when condensed forms a gasoline product of the desired boiling range. The condensate produced in the condenser 2, the polymers produced in the refining operation proper and other constituents higher boiling than suitable as components of the gasoline product are then discharged through connection 13.

I claim:

1. The improvement in refining gasoline which comprises supplying the gasoline to the refining operation as a vapor mixture including, in addition to the gasoline vapors, vapors of higher boiling hydrocarbons in proportions such that the vapor mixture when condensed forms a condensate containing not less than about 50% and not more than about 75% of the gasoline product, passing this vapor mixture first through a condensing operation and condensing therein a part of the higher boiling hydrocarbons, passing the total resulting vapor mixture including the condensate so produced then through an adsorptive catalyst, condensing and separating from the vapor mixture after passage through the adsorptive catalyst those constituents higher boiling than suitable as components of the gasoline product and then condensing the remaining vapors to form the refined gasoline product.

2. The improvement in refining gasoline which comprises supplying the gasoline to the refining operation as a vapor mixture including, in addition to the gasoline vapors, vapors of higher boiling hydrocarbons in proportions such that the vapor mixture when condensed forms a condensate containing not less than about 60% and not more than about 70% of the gasoline product, passing this vapor mixture first through a condensing operation and condensing therein a part of the higher boiling hydrocarbons, passing the total resulting vapor mixture including the condensate so produced then through an adsorptive catalyst, condensing and separating from the vapor mixture after passage through the adsorptive catalyst those constituents higher boiling than suitable as components of the gasoline product and then condensing the remaining vapors to form the refined gasoline product.

3. The improvement in refining gasoline which comprises supplying the gasoline to the refining operation as a vapor mixture including, in addition to the gasoline vapors, vapors of higher boiling hydrocarbons in proportions such that the vapor mixture when condensed forms a condensate containing not less than about 50% and not more than about 75% of the gasoline product, passing this vapor mixture first through a condensing operation and condensing therein a part of the higher boiling hydrocarbons, passing the total resulting vapor mixture including the condensate so produced then through an adsorptive catalyst, subjecting the total resulting vapor mixture including the condensate previously mentioned and the polymers produced by the vapor-catalyst contact then to a fractionating operation and condensing and separating therein those constituents higher boiling than suitable as components of the gasoline product, and condensing the remaining vapors from the fractionating operation to form the refined gasoline product.

In testimony whereof I affix my signature.

EUGENE C. HERTHEL.